United States Patent [19]

O'Neill

[11] 4,024,349
[45] May 17, 1977

[54] QUASI-RESONANT TRANSFER CONFERENCING CIRCUIT

[75] Inventor: John Francis O'Neill, Boulder, Colo.

[73] Assignee: Bell Telephone Laboratories, Incorporated, Murray Hill, N.J.

[22] Filed: Apr. 22, 1976

[21] Appl. No.: 679,244

[52] U.S. Cl. .................. 179/15 AA; 179/18 BC; 179/170 NC
[51] Int. Cl.² ................................ H04J 3/02
[58] Field of Search ....... 179/1 CN, 18 BC, 15 AA, 179/15 AT, 15 A, 170 NC

[56] References Cited
UNITED STATES PATENTS

| | | | |
|---|---|---|---|
| 2,936,337 | 5/1960 | Lewis | 179/15 AA |
| 3,319,005 | 5/1967 | Gaunt | 179/15 AA |
| 3,835,259 | 9/1974 | Medill | 179/18 BC |

FOREIGN PATENTS OR APPLICATIONS 904,231   8/1962   United Kingdom

Primary Examiner—William C. Cooper
Assistant Examiner—Joseph Popek
Attorney, Agent, or Firm—Howard R. Popper

[57] ABSTRACT

A conference port for permitting simultaneous voice communication among a plurality of local stations and an external or central office line is shown. The stations may be part of a time division PBX or may be arranged as a time-sampled key telephone system having access to the same line. The conference port includes a first operational amplifier for summing the station port voltages on a capacitor during an interval that is a predetermined fraction of the resonant transfer interval. This first, or quasi-resonant, interval is sufficient to reduce the initial voltage on each of the station port sampling capacitors to a predetermined fraction of their initial level. At the conclusion of this interval the voltage on the summing capacitor in the conference port is multiplied by an appropriate factor in a second operational amplifier and is applied back simultaneously to all of the conference ports together with the signal incoming over the external or central office line. The voltage impulse, so applied, causes the signal contributed by each station port to appear at each other station port attenuated by a suitable factor, illustratively 6dB, while the incoming signal appears full strength at each station port. Accordingly, good return loss is provided at each station port and contrast between signals from stations and the incoming line is reduced via the controllable station-to-station loss.

8 Claims, 3 Drawing Figures

QUASI-RESONANT TRANSFER CONFERENCING CIRCUIT

BACKGROUND OF THE INVENTION

This invention relates to time division or other switching or key telephone systems and more particularly, to such systems employing resonant transfer techniques.

Resonant transfer as disclosed for example, in W. D. Lewis U.S. Pat. No. 2,936,337 issued on May 10, 1960, involves the use of an extra series inductor to resonate with the sampling capacitor of a port circuit during the interval that the port circuit's sampling switch is closed so that all of the voltage on the sampling capacitor will be transferred through the switch during an interval of time equal to any odd number of half cycles of the resonant frequency.

In W. B. Gaunt U.S. Pat. No. 3,319,005 issued May 9, 1967, a circuit is shown which employs resonant transfer techniques to permit a number of station ports to confer with each other. The voltages appearing on the sampling capacitors of each of the station ports are interchanged during successive time slots with the voltages on a sampling capacitor in the conference port.

In British Pat. No. 904,231 published Aug. 22, 1962, a time division system is shown in which each port circuit has three gates associated respectively with the receiving path, the sending path and the bidirectional path to the telephone set. The gates are operated during different time slots to permit the bidirectional exchange of the voltage samples and the use, if desired, of one-way amplifiers in each of the one-way transmission paths.

More recently, D. G. Medill and P. A. Vachon in U.S. Pat. No. 3,835,259 issued Sept. 10, 1974, have shown that a useful conferencing system may be provided without using resonant transfer techniques. The Medill-Vachon system uses the sample and hold techniques and equips each of the port circuits with a pair of operational amplifiers having different gains available at different ones of their respective input terminals.

While each of the foregoingly described switching systems is of utility in its own right, the need persists to provide a conferencing arrangement that has good return loss at the talking station, suitable attenuation in the voice path among the locally conferring stations and as little attenuation as possible, in view of stability requirements, in the voice path between each of the stations and the external or central office lines.

SUMMARY OF THE INVENTION

The foregoing and other objects and features are achieved in accordance with the principles of my invention in one illustrative embodiment thereof in which a quasiresonant transfer interval is used to gather voltage samples from all of the conferring station ports and sum them on a capacitor in the conference port. During a subsequent, full-resonant transfer interval, a suitable fraction of the summation signal on the conference port capacitor, together with an appropriate fraction of the signal incoming over the external line, is applied through an operational amplifier to all of the conferring station ports. During the first or quasi-resonant transfer interval which is less than the interval for full resonant transfer, the charge on each station port sampling capacitor is not fully transferred but only so much charge is taken as well reduce the individual port capacitor voltage by a given factor, illustratively ½. During the second or full resonant transfer interval, a suitable fraction of the resultant summation signal on the conference port capacitor is "returned" to all of the station ports.

Because of the summation signal each station port's sampling capacitor is subjected to a voltage impulse the amplitude of which is the difference between the output of the operational amplifier (hereafter, opamp) and the voltage on that capacitor remaining after the first shorter-than-resonant transfer interval. After the voltage impulse has been applied for an interval equal to the duration of a half cycle at the resonant transfer frequency, the voltage on each station port's sampling capacitor will overshoot the opamp output voltage by the amplitude of the aforementioned voltage impulse.

In the illustrative system wherein two station ports are arranged in a conference call with a central office line, the voltage on each station port's sampling capacitor will be reduced respectively to $v_a/2$ and $v_b/2$ during the first or quasi-resonant transfer interval which has a duration of ⅓ pi radians (measured at the resonant transfer frequency). A first operational amplifier in the conference port applies a voltage to the conference port's summing capacitor which is the sum of the initial voltage on each of the station ports or $v_a + v_b$. During the second interval a second operational amplifier in the conference port sums ¼ the voltage on the summing capacitor, $(v_a + v_b)/4$, with half the voltage incoming from the external or central office line, $v_1/2$, and applies the resultant to all of the station ports.

After an interval equal to that of a half cycle measured at the resonant transfer frequency, the voltage present on each station port's capacitor will be the sum of the opamp output plus the impulse voltage amplitude experienced by that station's capacitor. With respect to station port $a$, this is:

$$(v_a + v_b)/4 + v_1/2 + [(v_a + v_b)/4 + v_1/2 - v_a/2] \quad (1)$$

or $$v_b/2 + v_1. \quad (2)$$

With respect to station port $b$, sum of the opamp output and the impulse experienced by station port b's sampling capacitor is:

$$(v_a + v_b)/4 + v_1/2 + [(v_a + v_b)/4 + v_1/2 - v_b/2] \quad (3)$$

or $$v_a/2 + v_1. \quad (4)$$

It will be noted from the above equations (2) and (4) that station port $a$ receives half the initial voltage sample provided by station port $b$ and the full voltage sample provided by the incoming line. Likewise, from equation (4) station port $b$ receives half the initial voltage sample put out by station port $a$ plus the full voltage of the sample incoming from the external line. In communications parlance, the return loss for each station port is 100 percent and thus echo-free. The signal from other stations in the group is attenuated 6dB and the signal from the remote or external line is not attenuated at all. An attenuation of approximately 6dB is found to be desirable in communications connections established among closely-situated stations to avoid undue disparity with the signal from the external line. To this end, a small resistor is employed to reduce the gain from the incoming line to all stations by an amount which is negligible for one station which increases as the number of stations included in a conferenced connection increases.

BRIEF DESCRIPTION OF THE DRAWING

The foregoing and other features of my invention may become more apparent from the ensuing detailed description and drawing, in which.

Detailed Description

Figure 1:
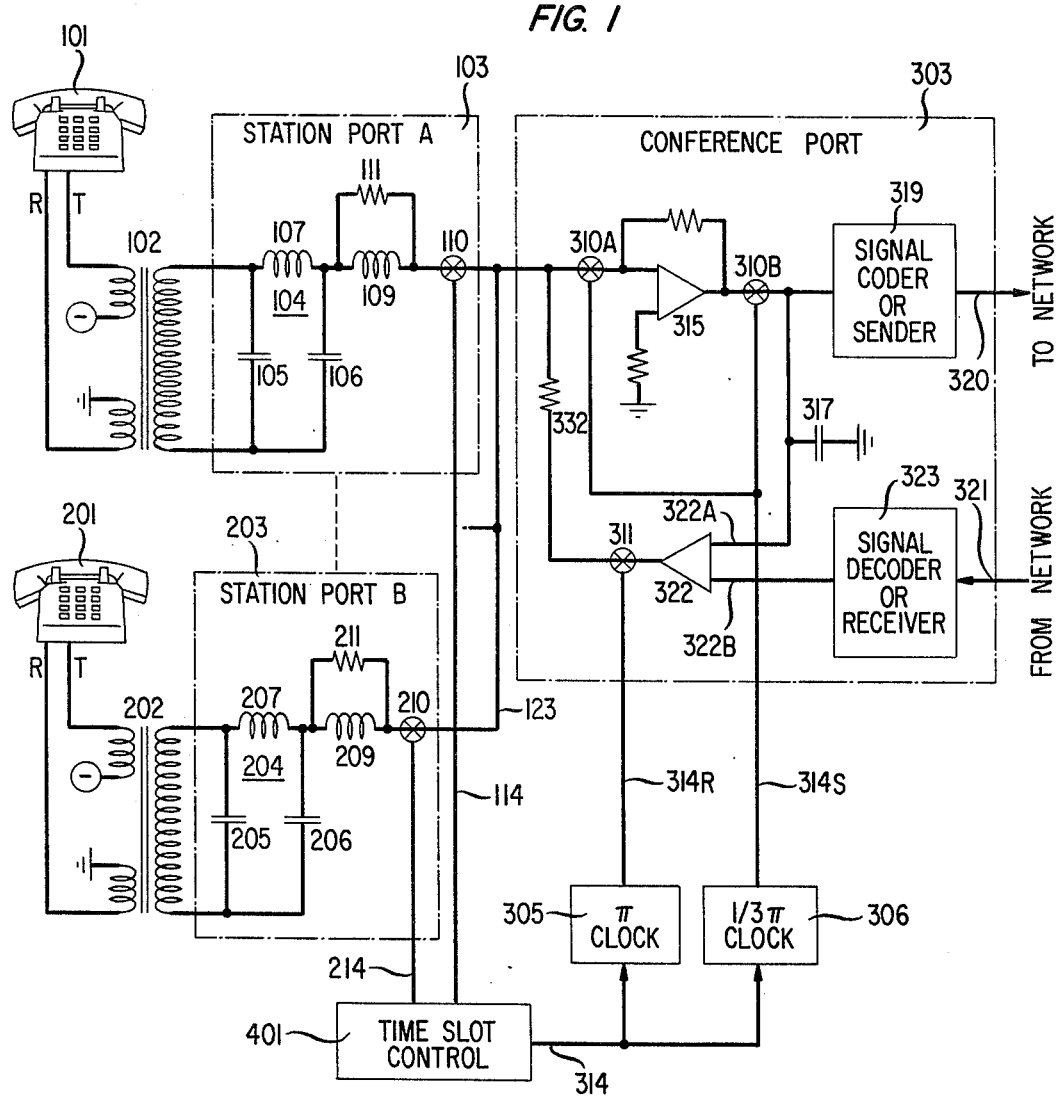
FIG. 1 shows an illustrative embodiment of a time division switching system according to the principles of my invention.

Referring now to FIG. 1, a first telephone set 101 is connected by the usual tip and ring conductors T, R to the primary winding of a loop transformer 102 by means of which the telephone set receives battery and ground. Transformer 102 is connected to station port circuit 103 which includes a conventional low-pass filter 104 having shunt capacitors 105 and 106 and a series inductor 107. Station port 103 also includes a sampling switch 110 and a resonant transfer inductor 109 in series between switch 110 and shunt capacitor 106. Inductance 109 is designed to resonate with the capacitance of capacitor 106 as in conventional resonant transfer circuits of the type disclosed in the aforementioned W. D. Lewis patent. Resistor 111 acts to provide a current path for the energy stored in inductor 109 when switch 110 is opened, but is sufficiently large so as not to significantly affect resonant energy transfer.

Another telephone set 201, its associated loop transformer 202 and a corresponding station port circuit 203 are shown, the parts thereof numbered with the hundreds digit "2" being comparable in all respects to those associated with station set 101 bearing the hundreds digit "1".

When sampling switches 110 and 210 of station port circuits 103 and 203 are closed by activation of leads 114 and 214 under control of controller 401, station sets 101 and 102 are established in communications relationship with conferencing bus 123. Controller 401 may take the form of any well known time division or common time switching central control arrangement, and accordingly, need not be described herein. So far as the present invention is concerned, the sole function of controller 401 is to close the sampling switches 110, 210 in port circuits 103, 203 during the same interval of time. Although only two port circuits are shown, it will be apparent that any number of similar port circuits may be connected to bus 123 in a conference connection with telephone sets 101, 201 simply by controller 401 operating their respective sampling switches during the same time interval. Bus 123 may be either a time division bus, to which all stations and line (or conference) ports are connected, or a key system cross-connect wire by means of which only certain stations are cross-connected to conference port 303. In the latter case port 303, is, in fact, a key system line port. Incident to the closure of sampling switches 110 and 210 and in the same manner, controller 401 activates conference port control lead 314 to clock interval circuits 305 and 306.

Clock circuit 306 advantageously comprises a monopulser (not shown) whose output couples the signal on lead 314 to lead 314S to operate switches 310 A and B at the same instant that leads 114 and 214 are energized to operate switches 110 and 210. However, after an interval of pi/3 measured at the resonant transfer frequency, the monopulser changes state and circuit 306 decouples lead 314S from lead 314 thereby opening switches 310 A and B.

Clock circuit 305 advantageously includes a delay circuit in addition to a monopulser (not shown) so that lead 314 may be connected to lead 314R and thereby operate switch 311 immediately after lead 314 is de-energized. After an ensuing interval of pi radians the monopulser within circuit 305 switches state and lead 314R is disconnected from lead 314 thereby opening switch 311.

When switches 310 A and B are closed, the output of summing amplifier 315 is connected to conference port summing capacitor 317. When switches 310 A and B are closed a resonant transfer circuit is completed for the transfer of charge from sampling capacitor 106 of station port 103 to capacitor 317 over a path that includes resonant transfer inductor 109, sampling switch 110, bus 123 an summing amplifier 315. Likewise a path is completed to transfer the charge on station port 203 sampling capacitor 206 to summing capacitor 317 over a path that includes resonant transfer inductor 209, sampling switch 210, time division bus 123 and amplifier 315.

Since the switches 310 A and B are closed for an interval somewhat less than that of the normal resonant transfer interval, less than the full charge initially present on each of capacitors 106 and 206 is removed. If the interval during which switches 310 are closed is equal to ⅓ pi radians, measured at the resonant transfer frequency, only half the charge initially present on each of capacitors 106 and 206 will be transferred, and consequently, each of their initial voltages will be reduced by the factor ½.

Figure 2:
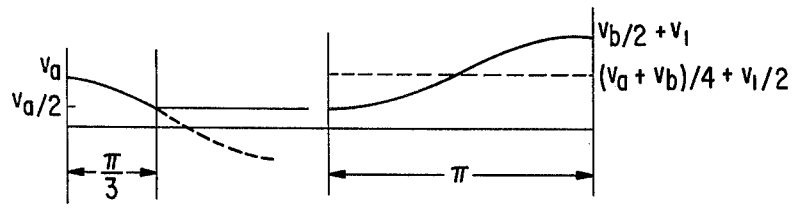
FIGS. 2 and 3 show the approximate waveforms on the respective sampling capacitors of the illustrative station ports of FIG. 1, neglecting the effect of small resistor 332.
Figure 3:
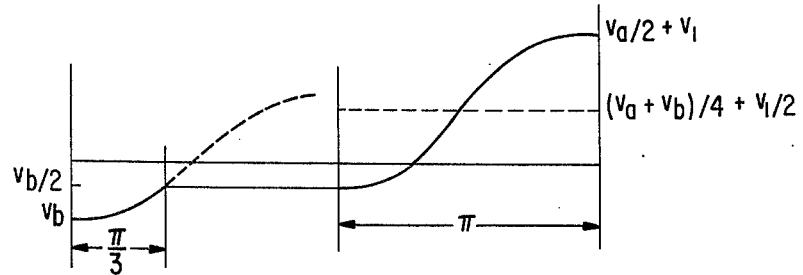

Referring to FIGS. 2 and 3, when switches 310 are opened after ⅓ pi radians, the voltage on each of capacitors 106 and 206 will be $v_a/2$ and $v_b/2$, respectively. The gain of summing amplifier 315, however, is sufficient to apply the full sum voltage $v_a + v_b$ on capacitor 317. This voltage may be encoded by a suitable signal coder or sender 319 and applied to outgoing path 320 to a switching network or a remote central office (not shown).

After switches 310 are opened, and advantageously immediately thereafter, switch 311 at the output of operational amplifier 322 is closed. The summation voltage on capacitor 317 is applied to the upper input 322A of operational amplifier 322. The signal incoming from the remote switching network or central office on incoming highway 321, suitably decoded by receiver 323 which may include a signal decoder (not explicitly shown), is applied to the lower input 322B of operational amplifier 322. Amplifier 322 multiplies the signal applied at input 322A by the factor (−¼) and multiplies the signal applied at its input 322B by the factor (½). Accordingly, the output applied by amplifier 322 to time division bus 123 when switch 311 is closed is $(v_a + v_b)/4 + v_1/2$ where $v_1$ is the decoded voltage incoming over highway 321 from the remote office (not shown).

Switch 311 is closed for the full resonant transfer interval, pi radians, measured at the resonant transfer frequency. It will be recalled that the voltage remaining on the sampling capacitor 106 of station port 103 was $v_a/2$ while that remaining on sampling capacitor 206 of station port 203 was $v_b/2$. At each station port the respective capacitor 106, 206 is therefore subjected to a voltage impulse whose amplitude is the difference between the amplifier 322 output, $(v_a + v_b)/4 + v_1/2$, and the voltage on the respective capacitor remaining after the opening of conference port switches 310 A and B. After switch 311 has been closed for pi radians the voltage on capacitor 106 as can be seen from FIG. 2, is the sum of the output signal of operational amplifier 322 plus the aforementioned impulse amplitude, or $$(v_a + v_b)/4 + v_1/2 + [(v_a + v_b)/4 + v_1/2 - v_a/2] \qquad (1)$$

or $$v_b 2 + v_1. \qquad (2)$$

Likewise, the voltage on station port 203 capacitor 206 (see FIG. 3) is the sum of the aforementioned voltage impulse and the opamp output voltage, or $$(v_a + v_b)/4 + v_1/2 + [(v_a + v_b)/4 + v_1/2 - v_b/2] \qquad (3)$$

or $$v_a/2 + v_1. \qquad (4)$$

The significance of equations (2) and (4) is that the voltage on each station port is half the voltage on the other station port plus essentially the full incoming voltage from the remote or external line. Accordingly, there is no echo at any station port due to the speaker's own voice, the external signal is essentially unattenuated and the signal from the other station port which, likely, is quite close by and otherwise uncomfortably loud, will be attenuated by 6dB. The above equations (and FIGS. 2 and 3) omit the small but progressive attenuation in $v_1$ produced by the presence of summing resistor 322 as the number of stations (not shown), but similar to station ports 103 and 203, are added to the conference bus 123.

In conference port 303 it was noted above that input 322A of operational amplifier 322 had a gain of (−¼). This was based on an embodiment in which clock circuit 306 is arranged to maintain lead 314S energized for an interval of ⅓ pi. If the interval of switches 310 A and B closure is lengthened somewhat to ⅔ pi, the voltage applied to summing capacitor 317 will undergo a polarity reversal. In this case the gain at terminal 322 may simply be (+¼). In addition, it should be noted that the time of switch 311 closure following the opening of switches 310 A and B is not critical so long as the interval therebetween does not permit any appreciable charge to drain off capacitor 317. Thus, in some systems, it may be convenient to operate switch 311 after a small delay interval. Further and other modifications will be apparent to those skilled in the art without departing from the principles of my invention.

What is claimed is:

1. A conference port for a telephone switching system including a plurality of station ports each having a resonant transfer sampling circuit, said conference port comprising:

a capacitor and first summing amplifier means for applying to said capacitor during a first time interval lasting a predetermined fraction of the normal resonant transfer interval summation voltage samples from all said station ports; and second summing amplifier means for returning to all of said station ports during a second time interval having a longer duration than said first time interval a predetermined fraction of the summation voltage on said capacitor.

2. A conference port according to claim 1 wherein said first summing amplifier means includes a summing amplifier and a pair of first sampling switches, said sampling switches being connected between the input to and the output of said summing amplifier and said capacitor, and the input of said amplifier being connectable in common to all of said station ports via one of said first sampling switches.

3. A conference port according to claim 2 further including a terminal for an external line, and wherein said second summing amplifier means includes a differential amplifier and a second sampling switch connected at the output of said amplifier, one of the inputs of said differential amplifier being connected to said capacitor and the other of its inputs being connected to said terminal.

4. A conference port according to claim 1 wherein said first summing amplifier means includes a summing amplifier and a pair of first switches for connecting said amplifier means includes a differential amplifier, an input terminal for an external line.

said capacitor and said input terminal being connected to the differential inputs of said differential amplifier, and a second switch for connecting the output of said differential amplifier to said station ports.

5. A telephone switching system comprising:
a communications bus,
a plurality of station ports each having a resonant transfer sampling circuit connectable to said communications bus,
a common port circuit having a summing capacitor, a summing amplifier, a pair of first switches for connecting said summing amplifier between said bus and said summing capacitor, a differential amplifier having one of its inputs connected to said summing capacitor, a terminal for an external line connected to the other input of said differential amplifier, a second switch for connecting said differential amplifier to said bus; and
a clock circuit means for controlling the connection of said pair of common port switches to said communications bus throughout the continuance of a first quasi-resonant transfer interval and for controlling the connection of said second switch to said common bus during a second, full resonant transfer interval.

6. A time division switching system comprising a plurality of station ports each having a resonant transfer sampling circuit capable of exhibiting an instantaneous voltage corresponding to a local speech signal, a communications bus, a conference port circuit having an external line connected thereto capable of exhibiting an instantaneous voltage corresponding to an incoming speech signal, and means for simultaneously controlling all of the time division sampling switches in said plurality of said station ports and a first time division switch in said conference port during an interval less than a resonant transfer interval to reduce the voltage sample on each of said station port resonant transfer sampling circuits by a predetermined factor and for operating a second time division sampling switch in said conference port circuit to reapply simultaneously to all of said station port circuits a predetermined fraction of the voltage corresponding to the charge passed through said first conference port switch together with a sample of said incoming signal on said external line.

7. A conference port for a telephone switching system including an external line and a plurality of station ports, each of said ports having a resonant transfer sampling circuit and being connected to a common bus, the conference port comprising:
   a summing capacitor,
   a first operational amplifier having a first input connected to the common bus, a second input connected to ground and an output connected to said summing capacitor, and
   a second operational amplifier having a first input connected to said summing capacitor, a second input connected to external line, and an output connected to said common bus.

8. A conference port in accordance with claim 7 further comprising first means for connecting said common bus to said summing capacitor through said first operational amplifier for an interval of ⅓ pi radians at the resonant transfer frequency of the sampling circuits, and
   second means for connecting said summing capacitor to the common bus through said second operational amplifier for an interval of pi radians at said resonant transfer frequency.

* * * * *